Nov. 11, 1930. C. P. ROBERTS 1,781,302
VENTILATING BAKING PAN
Filed Feb. 27, 1928   2 Sheets-Sheet 1
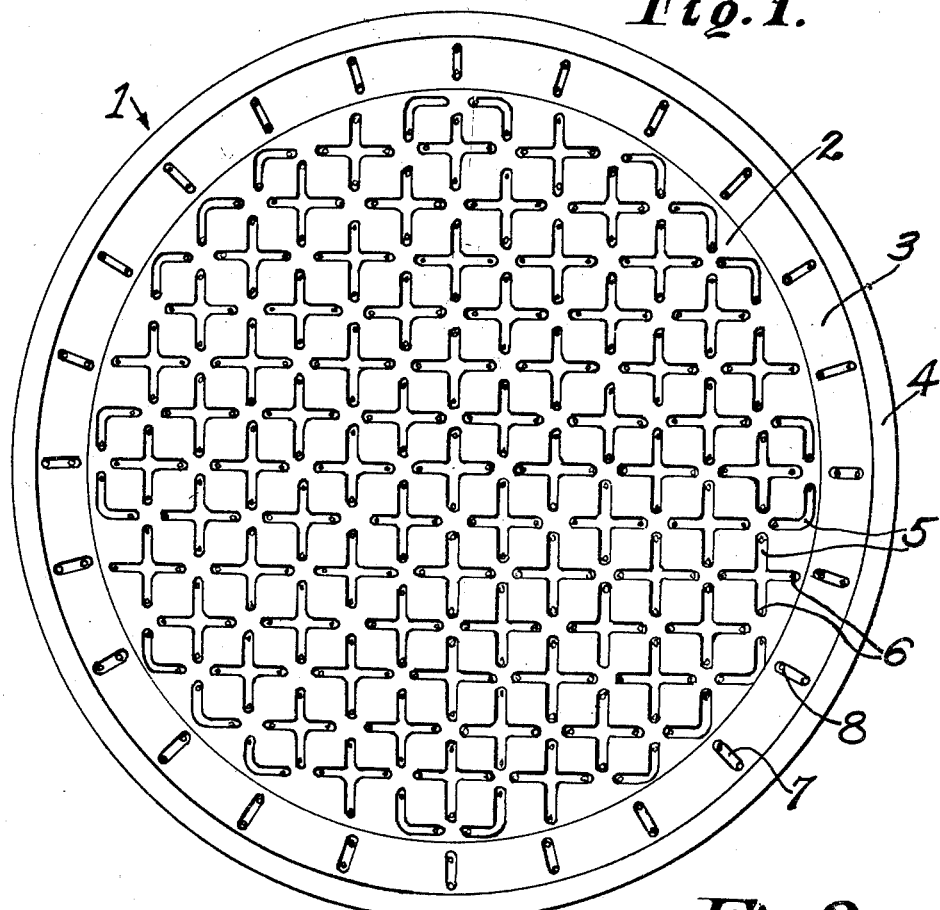
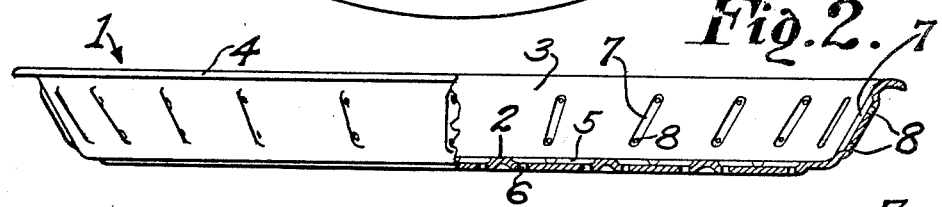
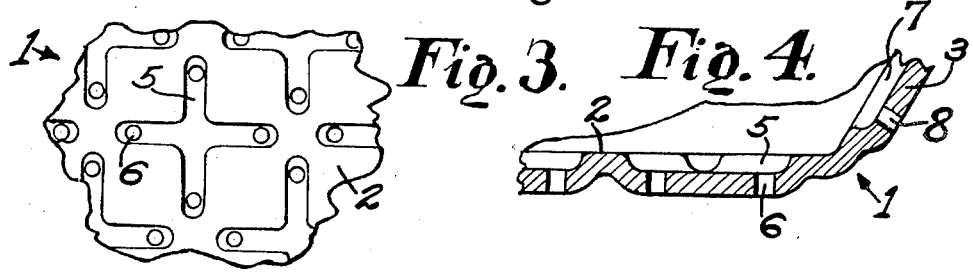
INVENTOR.
Clarence P. Roberts

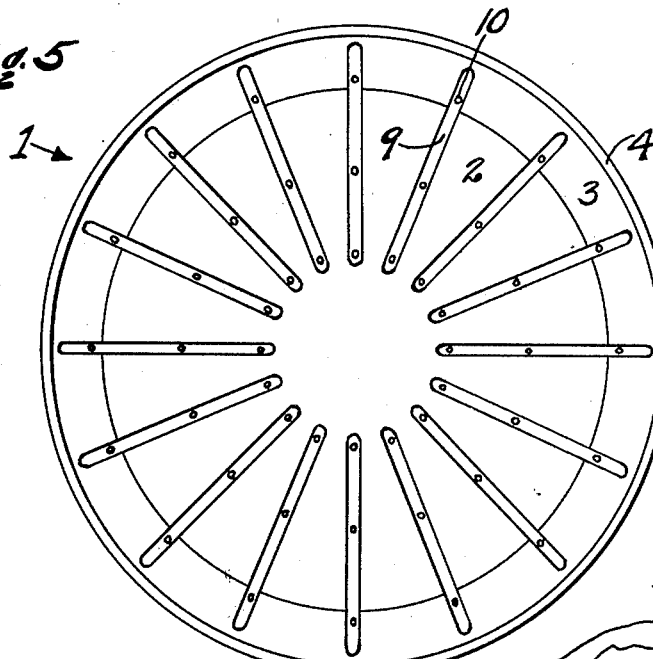
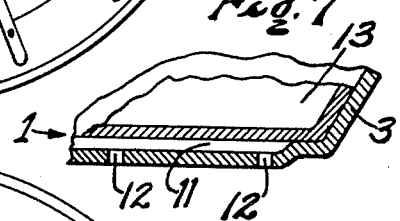
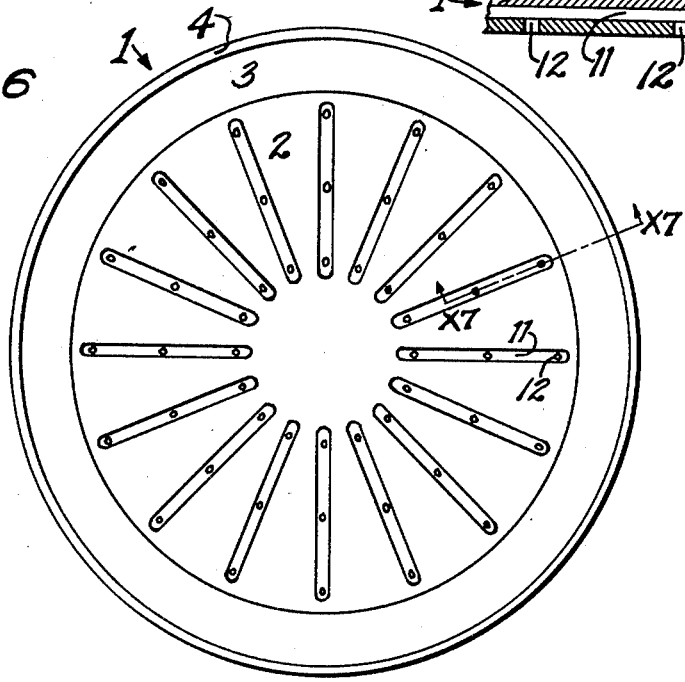

Patented Nov. 11, 1930

1,781,302

UNITED STATES PATENT OFFICE

CLARENCE P. ROBERTS, OF LOS ANGELES, CALIFORNIA

VENTILATING BAKING PAN

Application filed February 27, 1928. Serial No. 257,134.

An object of this invention is to eliminate the soggy bottom crust of a pie by means of ventilation.

Another object is to provide means for quickly baking a pie crust.

Simpleness and cheapness of construction are other objects.

A feature of this invention is that provision is made for proper ventilation of the pie after it is baked to keep it dry.

This invention is applicable to circular, rectangular and square pans in plan, such as are customarily used for baking pies of any kind, and which may be put to many other uses.

Other objects, advantages and features of invention may appear from the accompanying drawings, the subjoined detail description and the appended claims.

The invention is not limited to the specific construction shown, and it is understood that forms of embodiment other than those shown may be employed without departing from the invention or from the principles herein disclosed and embodied in the mechanism herein set forth and claimed.

The accompanying drawings illustrate the invention.

Fig. 1 is a plan view of a baking pan of a form at present deemed most desirable for general use.

Fig. 2 is a side elevation of Fig. 1 with a fragment broken away to show interior construction which is partly in section.

Fig. 3 is an enlarged fragmental detail of the bottom portion of Fig. 1, showing some of the channels and orifices.

Fig. 4 is an enlarged fragmental detail elevation in section showing construction of the channels and orifices.

Fig. 5 is a plan view of a modified form of the invention showing the channels radiating from near the center.

Fig. 6 is a view analogous to Fig. 5 omitting the channels from the flange.

Fig. 7 is an enlarged section taken on line $X^7$ Fig. 6 showing a fragment of a pie crust in place in the pan.

The invention (1) may be of aluminum, tin or other suitable sheet material, and comprises a bottom portion (2) that is provided with the flange (3) having a beaded edge (4).

The bottom portion (2) is provided with a plurality of Greek cross shaped channels (5) and orifices (6) in the bottom of the channels that permit of uniform circulation of heat through the bottom of the pan, when the pie is being baked and a uniform circulation of air after the pie is baked, and by this circulation of air the bottom crust of the pie is always kept dry.

The flange (3) is provided with a plurality of channels (7) and orifices (8) constructed and arranged as shown in Figures 1, 2 and 4.

Referring to Figure 5, the channels (9) radiate from a point near the center and continue on into the flange (3), and are provided with the orifices (10).

In Figure 6 the bottom portion (2) of the pan is provided with channels (11) that radiate from a point near the center and extend toward the periphery and that are provided with the orifices (12).

Referring to Figure 7 is shown a fragment of a crust (13) that is shown in place in the pan.

In operation, a pie is put in the oven to be baked, and to prevent the crust from being burnt in any one spot a uniform distribution of heat is provided through the orifices (6) and the channels (5).

After the pie is baked the pie is taken out of the oven and laid upon a shelf or any suitable place to cool off. To permit the bottom crust to cool quickly and prevent it from becoming soggy while in the pan, a uniform circulation of air is permitted at all times through the orifices and channels.

I claim:

1. A pan provided with depressions, and having a plurality of spaced openings at the bottom of each depression so as to provide air circulation in the depressions.

2. A pie pan provided with depressions in its bottom portion and flange, a plurality of spaced openings at the bottom of said depressions so as to provide air circulation in the depressions.

In testimony whereof, I have hereunto set my hand at Los Angeles, California, this 21st day of Feb. 1928.

CLARENCE P. ROBERTS.